United States Patent
Le et al.

(10) Patent No.: US 11,322,974 B2
(45) Date of Patent: *May 3, 2022

(54) FERRORESONANT TRANSFORMER SYSTEMS AND METHODS

(71) Applicant: ALPHA TECHNOLOGIES SERVICES, INC., Bellngham, WA (US)

(72) Inventors: Thanh Le, Ferndale, WA (US); James Richardson, Bellingham, WA (US); Litcho Datzov, Bellingham, WA (US)

(73) Assignee: Alpha Technologies Services, Inc., Bellingham, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/075,478

(22) Filed: Oct. 20, 2020

(65) Prior Publication Data
US 2021/0036546 A1 Feb. 4, 2021

Related U.S. Application Data
(63) Continuation of application No. 15/495,407, filed on Apr. 24, 2017, now Pat. No. 10,819,144, which is a
(Continued)

(51) Int. Cl.
*H02J 9/06* (2006.01)
*H01F 27/24* (2006.01)
*H01F 27/28* (2006.01)
*H01F 27/40* (2006.01)
*H01F 38/14* (2006.01)

(52) U.S. Cl.
CPC ............. *H02J 9/062* (2013.01); *H01F 27/24* (2013.01); *H01F 27/28* (2013.01); *H01F 27/40* (2013.01); *H01F 38/14* (2013.01); *H02J 9/067* (2020.01); *Y10T 29/49073* (2015.01)

(58) Field of Classification Search
CPC .......... H02J 9/062; H02J 9/067; H01F 27/24; H01F 27/28; H01F 38/14; H01F 27/40; Y10T 29/49073
See application file for complete search history.

(56) References Cited

U.S. PATENT DOCUMENTS 4,623,834 A * 11/1986 Klingbiel ................. G05F 1/20
323/258
10,819,144 B2 * 10/2020 Le ........................... H01F 27/40

FOREIGN PATENT DOCUMENTS

WO WO8521842 * 4/1985

* cited by examiner

*Primary Examiner* — Toan T Vu
(74) *Attorney, Agent, or Firm* — Schacht Law Office, Inc.; Michael R. Schacht

(57) ABSTRACT

A ferroresonant transformer assembly comprising, a core, a main shunt, first, second, and third windings, first and second tap connectors, and a selection connector. The first windings configured to be operatively connected to a primary power source. The first tap connector operatively connected to a first intermediate point defined by the third windings. The second tap connector operatively connected to a second intermediate point defined by the third windings. The selection connector operatively connected to the at least one load. Based on voltage requirements of the at least one load, the selection connector is operatively selectively connected to a selected tap connector selected from the first and second tap connectors.

20 Claims, 3 Drawing Sheets

Related U.S. Application Data continuation of application No. 14/071,497, filed on Nov. 4, 2013, now Pat. No. 9,633,781, which is a continuation of application No. 12/803,787, filed on Jul. 7, 2010, now Pat. No. 8,575,779.

(60) Provisional application No. 61/305,926, filed on Feb. 18, 2010.

FERRORESONANT TRANSFORMER SYSTEMS AND METHODS

RELATED APPLICATIONS

This application, U.S. patent application Ser. No. 15/075,478 filed Oct. 20, 2020 is a continuation of U.S. patent application Ser. No. 15/495,407 filed Apr. 24, 2017, now U.S. Pat. No. 10,819,144 which issued on Oct. 27, 2020.

U.S. patent application Ser. No. 15/495,407 is a continuation of U.S. patent application Ser. No. 14/071,497, filed Nov. 4, 2013, now U.S. Pat. No. 9,633,781, which issued on Apr. 25, 2017.

U.S. patent application Ser. No. 14/071,497 is a continuation of U.S. patent application Ser. No. 12/803,787 filed Jul. 7, 2010, now U.S. Pat. No. 8,575,779 which issued Nov. 5, 2013.

U.S. patent application Ser. No. 12/803,787 claims benefit of U.S. Provisional Patent Application Ser. No. 61/305,926 filed Feb. 18, 2010.

The contents of all related applications listed above are incorporated herein by reference.

TECHNICAL FIELD

The present invention relates the generation of a standby power signal and, more specifically, to uninterruptible power supply systems and methods using ferroresonant transformers.

BACKGROUND

Uninterruptible power supplies (UPS's) have long been used to provide at least temporary auxiliary power to electronic devices. Typically, a UPS is configured to switch between a primary power source and a standby power source as necessary to maintain constant power to a load.

For example, the primary power source may be a utility power supply, and the standby power source may take the form of a battery system. The UPS will normally operate in a line mode in which the utility power signal is passed to the load when the utility power signal is within predefined parameters. In the line mode, the UPS will typically also charge the battery system. When the utility power falls outside of the predefined parameters, the UPS will switch to standby mode in which an AC signal is generated based on the energy stored in the battery system.

A class of UPS's employs a ferroresonant transformer. A ferroresonant transformer is a saturating transformer that employs a tank circuit comprised of a resonant winding and capacitor to produce a nearly constant average output even if the input to the transformer varies. A typical UPS employing a ferroresonant transformer takes advantage of the voltage regulating properties of a ferroresonant transformer in both line and standby modes. In the context of a UPS, a ferroresonant transformer thus provides surge suppression, isolation, short circuit protection, and voltage regulation without the use of active components.

Conventionally, a ferroresonant transformer configured for use in a UPS system includes a core and an inductor arranged relative to the core to define: (a) a primary or input side of the transformer and (b) a secondary or output side of the transformer. A conventional ferroresonant transformer used in a UPS will further comprise input windings and inverter (resonant) windings arranged on the primary or input side and output windings on the secondary or output side.

An object of the present invention is to provide improved ferroresonant transformers for use in UPS systems.

SUMMARY

The present invention may be embodied as a ferroresonant transformer assembly adapted to be connected to a primary power source, an inverter system, a resonant capacitor, and at least one load. The ferroresonant transformer assembly comprises a core, a main shunt, first, second, and third windings, first and second tap connects, and a selection connector. The main shunt is arranged to define a primary side and a secondary side of the ferroresonant transformer assembly. The first windings are arranged on the primary side of the ferroresonant transformer assembly and are configured to be operatively connected to the primary power source. The second windings are arranged on the secondary side of the ferroresonant transformer assembly and are configured to be operatively connected to the inverter system. The third windings are arranged on the secondary side of the ferroresonant transformer assembly. The first tap connector is operatively connected to a first intermediate point defined by the third windings. The second tap connector is operatively connected to a second intermediate point defined by the third windings. The selection connector is operatively connected to the at least one load. Based on voltage requirements of the at least one load, the selection connector is operatively selectively connected to a selected tap connector selected from the first and second tap connectors.

The present invention may be embodied as an uninterruptible power supply system adapted to be connected to a primary power source, a battery system, and at least one load. The uninterruptible power supply comprises a ferroresonant transformer, an inverter, first and second tap connectors, a selection connector, and a resonant capacitor. The ferroresonant transformer comprises a core, a main shunt arranged to define a primary side and a secondary side of the ferroresonant transformer, first windings arranged on the primary side of the ferroresonant transformer, second windings arranged on the secondary side of the ferroresonant transformer; and third windings arranged on the secondary side of the ferroresonant transformer. The inverter is operatively connected to the second windings. The first tap connector is operatively connected to a first intermediate point defined by the third windings. The second tap connector is operatively connected to a second intermediate point defined by the third windings. The selection connector operatively connected to the at least one load. The first windings are operatively connected to the primary power source. The inverter is operatively connected to the battery system. In a line mode, power flows from the primary source to the at least one load through the ferroresonant transformer. In a standby mode, power flows from the inverter to the at least one load through the ferroresonant transformer. Based on voltage requirements of the at least one load, the selection connector is operatively selectively connected to a selected tap connector selected from the first and second tap connectors.

The present invention may be embodied as a method of supplying uninterruptible power to at least one load from a primary power source and a battery system comprising the following steps. A ferroresonant transformer comprising a core, a main shunt arranged to define a primary side and a secondary side of the ferroresonant transformer, first windings arranged on the primary side of the ferroresonant transformer, second windings arranged on the secondary side of the ferroresonant transformer, and third windings arranged on the secondary side of the ferroresonant transformer, where the third windings define first and second intermediate points; operatively connecting a first tap connector to the first intermediate point defined by the third windings is provided. A second tap connector is operatively connected to the second intermediate point defined by the third windings. A selection connector is operatively connected to the at least one load. An inverter is operatively connected to the second windings. The first windings are operatively connected to the primary power source. The inverter is operatively connected to the battery system. In a line mode, causing power to flow from the primary source to the at least one load through the ferroresonant transformer. In a standby mode, causing power to flow from the inverter to the at least one load through the ferroresonant transformer. Based on voltage requirements of the at least one load, operatively selectively connecting the selection connector to a selected tap connector selected from the first and second tap connectors.

DETAILED DESCRIPTION

Figure 1:
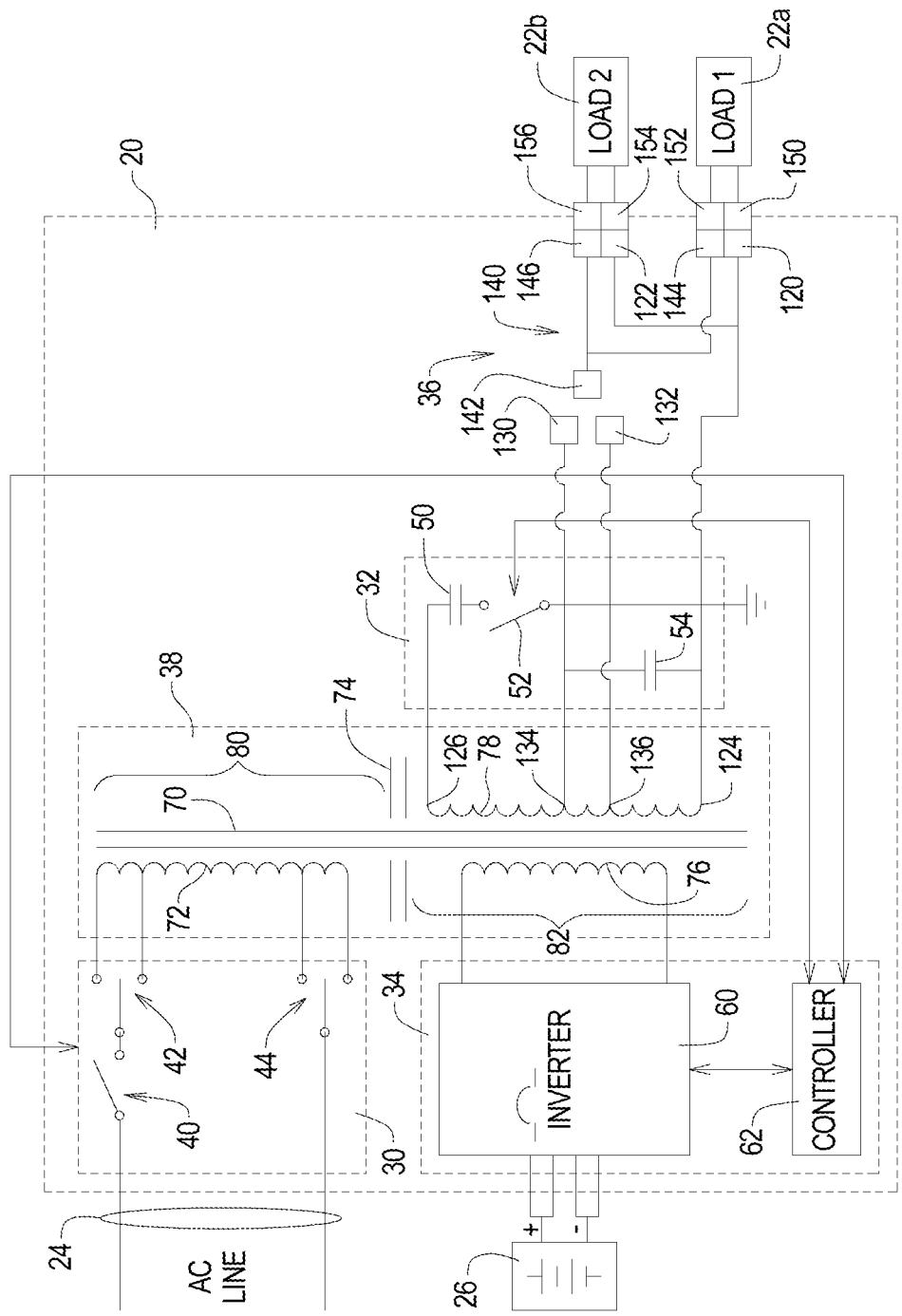
FIG. 1 is a simplified block diagram of a first embodiment of an uninterruptible power supply system using a ferroresonant transformer system constructed in accordance with, and embodying, the principles of the present invention.

Referring initially to FIG. 1 of the drawing, depicted therein is a first example of an uninterruptible power supply (UPS) system 20 constructed in accordance with, and embodying, the principles of the present invention.

The example UPS system 20 supplies power to a load 22 based on a primary power signal present on an AC power line 24 (line mode) or a secondary power signal generated by a battery pack 26 (standby mode). While the example secondary power signal is generated by a battery pack in the example UPS system 20, alternative power sources such as generators, fuel cells, solar cells, and the like may be used as the secondary power source.

The example UPS system 20 comprises an input section 30, an output section 32, an inverter section 34, a cable assembly 36, and a ferroresonant transformer 38.

The example input section 30 comprises a main switch 40 and first and second select switches 42 and 44. The example output section 32 comprises an output or resonant capacitor 50 and, optionally, a select switch 52 and a filter capacitor 54.

When the select switch 52 is closed, the output capacitor 50 forms a resonant or tank circuit with the transformer 38 as will be described in further detail below. When the select switch 52 is open, the output capacitor 50 is removed from the circuit formed by the output section 32 and transformer 38, and the filter capacitor 54 filters the output of this circuit.

The inverter section 34 comprises an inverter circuit 60. The inverter circuit 60 may be an H-bridge circuit or any other circuit capable of producing an appropriate AC power signal based on a DC power signal obtained from the battery pack 26. In particular, the inverter circuit 60 is pulse-width modulated, and the inverter section 34 functions as a switch mode power supply when the UPS system operates in the standby mode. The inverter section 34 and the inverter circuit 60 are or may be conventional and will not be described herein in further detail.

A controller 62 may be optionally included in the inverter section 34. If used, the controller 62 operates the switches 40 and 52 and controls the inverter circuit 60. The controller 62 may further control the charging of the battery pack 26 when the UPS system 20 operates in line mode based on the temperature, voltage, and/or current signals associated with the battery pack 26.

Figure 2:
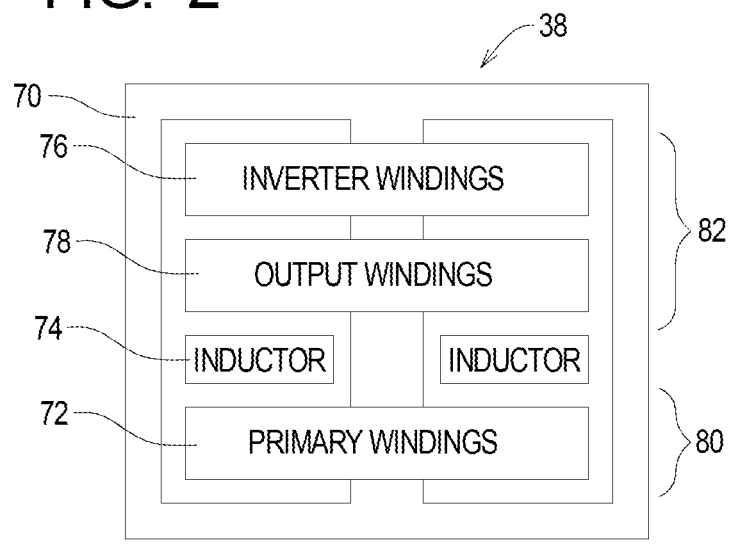
FIG. 2 is a somewhat schematic view of a ferroresonant transformer forming a part of the UPS system depicted in FIG. 1.

The ferroresonant transformer 38 comprises a core 70, input windings 72, an inductor 74, inverter windings 76, and output windings 78. The core 70 is or may be a conventional laminate structure. As shown in FIG. 2, the inductor 74 defines a primary side 80 and a secondary side 82 of the transformer 38. In the example transformer 38, only the input windings 72 are on the primary side 80 of the transformer 38. The inverter windings 76 and output windings 78 are on the secondary side 82 of the transformer 38. In particular, the output windings 78 are arranged between the inverter windings 76 and the inductor 74, and the inductor 74 is arranged between the output windings 78 and the input windings 72.

Figure 3:
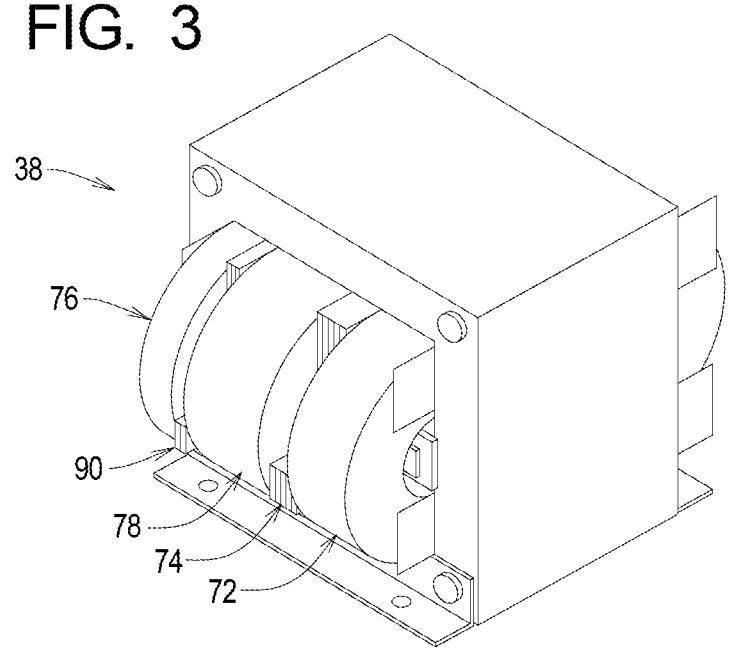
FIG. 3 is a perspective view of the ferroresonant transformer depicted in FIG. 2.
Figure 4:
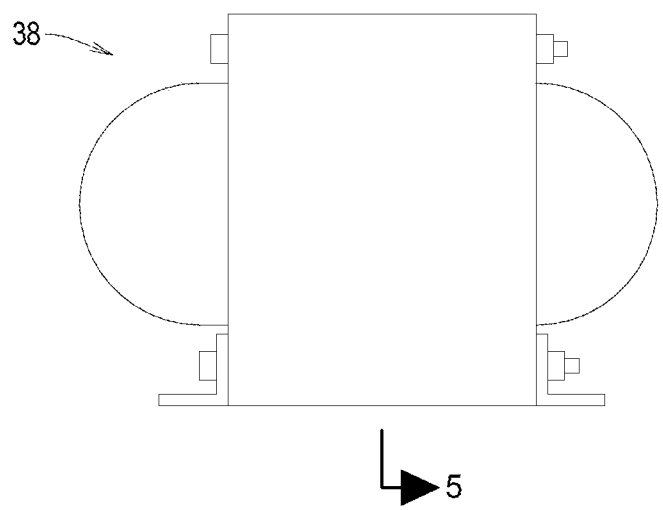
FIG. 4 is a side elevation view of the ferroresonant transformer depicted in FIGS. 2 and 3.
Figure 5:
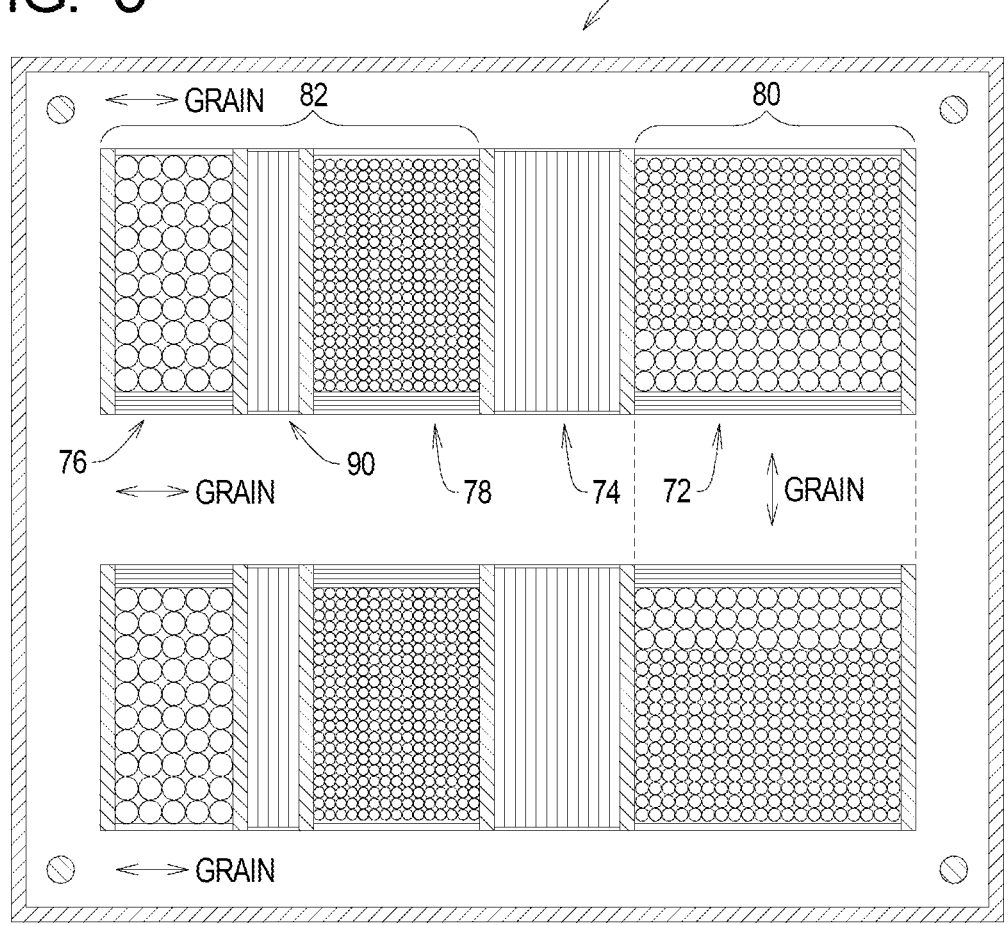
FIG. 5 is a section view taken along lines 5-5 in FIG. 4.

As perhaps best shown in FIGS. 3 and 5, the transformer 38 depicted in FIGS. 1 and 2 defines the following arrangement of windings and shunts: the input windings 72, a large (or main) shunt formed by the inductor 74, output windings 78, and inverter windings 76. FIGS. 3 and 5 further illustrate that, in the example transformer 38, a small (or minor) shunt 90 is arranged between the output windings 78 and the inverter windings 76. The small shunt 90 does not significantly affect the electromagnetic properties of the transformer 38 in the context of the overall UPS system 20 but is used in the example transformer 38 to allow the transformer 38 to operate as described herein in the context of the UPS system 20.

In the line mode, the AC power line 24 forms a primary power source that causes a primary signal to be present on the input windings 72. The input windings 72 are electromagnetically coupled to the output windings 78 such that a first output signal is supplied to one or both of the loads 22a and 22b when the UPS system 20 operates in the line mode.

In the standby mode, the battery pack 26 and inverter section 34 form a secondary power source that causes a secondary signal to be present on the inverter windings 76. The inverter windings 76 are electromagnetically coupled to the output windings 78 such that a second output signal is supplied to one or both of the loads 22a and 22b when the UPS system 20 operates in the standby mode.

The construction details of the transformer 38 are not critical to the general principles of the present invention and will depend upon a particular implementation of the UPS system 20 in which the transformer 38 is designed to operate. The example transformer 38 has the following characteristics:

| | |
|---|---|
| stacking | 3 × 3 interleaved |
| stack height | approximately 109.73 MM (4.32") |
| shunts | positioned in cores such that there is equal overhang on both sides |

| | |
|---|---|
| keeper | cut from E lamination at both ends of stack; tape tightly across keeper after E-I compaction to reduce noise |
| lamination | compact E-I lamination together without air gap |
| sleevings | nylon sleevings used with bolts |
| shims | use wood shims to fill in gaps between windings and core |
| small shunt | approximately 2.00 mm (0.075") thick (4 pcs grade H50 or 3 pcs M54 shunt lamination); polyester tape |
| large shunt | approximately 16 mm (0.625") thick (stack height adjusted to meet short circuit current requirement); polyester tape |
| core | E-I lamination; grain orientation as shown in FIG. 3 |
| varnish | penetrate at least 80% of the windings and be fully cured |

The example cable assembly 36 connects the output section 32 to one of first and second example loads 22a or 22b. In particular, the cable assembly 36 comprises first and second winding connectors 120 and 122 operatively connected to a first end 124 of the output windings 78. A second end 126 of the output windings 78 is connected to the output capacitor 50. The cable assembly 36 further comprises first and second tap connectors 130 and 132 operatively connected to first and second intermediate points 134 and 136, respectively, of the output windings 78. The example cable assembly 36 additionally comprises a selection cable 140 comprising a selection connector 142 and first and second output connectors 144 and 146. The first load 22a comprises first and second load connectors 150 and 152, while the second load 22b comprises second and third load connectors 154 and 156.

Using the example cable assembly 36, the selection connector 142 is connected to either the first tap connector 130 or the second tap connector 132 depending upon the voltage requirements of the loads 22a and 22b. The first and third load connectors 150 and 154 are connected to the first and second winding connectors 120 and 122, and the second and fourth winding connectors 152 and 156 are connected to the first and second output connectors 144 and 146, respectively. The cable assembly 36 thus allows one or both of the loads 22a and 22b to be connected to the output section 32 and the output windings 78 and, more specifically, to an appropriate portion of the output windings 78 as determined by the first and second tap connectors 130 and 132. The selection of the appropriate tap connector 130 or 132 is based on the voltage requirements of the loads 22a and 22b.

Given the foregoing, it should be apparent that the principles of the present invention may be embodied in forms other than those described above. The scope of the present invention should thus be determined the claims to be appended hereto and not the foregoing detailed description of the invention.

What is claimed is:

1. A ferroresonant transformer assembly adapted to be connected to a primary power source, an inverter system, a resonant capacitor, and at least one load, the ferroresonant transformer assembly comprising:
   a core;
   a main shunt arranged to define a primary side and a secondary side of the ferroresonant transformer assembly;
   first windings arranged on the primary side of the ferroresonant transformer assembly, where the first windings are configured to be operatively connected to the primary power source;
   second windings arranged on the secondary side of the ferroresonant transformer assembly, where the second windings are configured to be operatively connected to the inverter system;
   third windings arranged on the secondary side of the ferroresonant transformer assembly;
   a first tap connector operatively connected to a first intermediate point defined by the third windings;
   a second tap connector operatively connected to a second intermediate point defined by the third windings; and
   a selection connector operatively connected to the at least one load; whereby
   based on voltage requirements of the at least one load, the selection connector is operatively selectively connected to a selected tap connector selected from the first and second tap connectors.

2. A ferroresonant transformer assembly as recited in claim 1, further comprising:
   a cable assembly operatively connected between the selection connector and at least one of a plurality of loads.

3. A ferroresonant transformer assembly as recited in claim 2, in which the cable assembly is operatively connected between the selection connector and a plurality of loads.

4. A ferroresonant transformer assembly as recited in claim 1, in, the third windings are configured to be selectively operatively connected to or disconnected from the resonant capacitor.

5. A ferroresonant transformer assembly as recited in claim 4, in which the ferroresonant transformer
   operates as a resonant circuit when the third windings are operatively connected to the resonant capacitor; and
   does not operate as a resonant circuit when the third windings are disconnected from the resonant capacitor.

6. An uninterruptible power supply system adapted to be connected to a primary power source, a battery system, and at least one load, the uninterruptible power supply comprising:
   a ferroresonant transformer comprising
      a core;
      a main shunt arranged to define a primary side and a secondary side of the ferroresonant transformer;
      first windings arranged on the primary side of the ferroresonant transformer;
      second windings arranged on the secondary side of the ferroresonant transformer; and
      third windings arranged on the secondary side of the ferroresonant transformer; and
   an inverter, where the inverter is operatively connected to the second windings;
   a first tap connector operatively connected to a first intermediate point defined by the third windings;
   a second tap connector operatively connected to a second intermediate point defined by the third windings; and
   a selection connector operatively connected to the at least one load;
   a resonant capacitor; wherein
   the first windings are operatively connected to the primary power source;
   the inverter is operatively connected to the battery system;

in a line mode, power flows from the primary source to the at least one load through the ferroresonant transformer; and in a standby mode, power flows from the inverter to the at least one load through the ferroresonant transformer; and based on voltage requirements of the at least one load, the selection connector is operatively selectively connected to a selected tap connector selected from the first and second tap connectors.

7. An uninterruptible power supply system as recited in claim 6, further comprising a select switch, where the select switch is configured to:

connect the resonant capacitor to the third windings when the uninterruptible power supply is in the line mode; and disconnect the resonant capacitor from the third windings when the uninterruptible power supply is in the standby mode.

8. An uninterruptible power supply system as recited in claim 6, in which the main shunt is formed by an inductor.

9. An uninterruptible power supply system as recited in claim 6, in which the ferroresonant transformer operates as a resonant circuit when the third windings are operatively connected to the resonant capacitor; and does not operate as a resonant circuit when the third windings are disconnected from the resonant capacitor.

10. An uninterruptible power supply system as recited in claim 6, in which the inverter is pulse-width modulated.

11. An uninterruptible power supply system as recited in claim 6, in which the inverter is a switch mode power supply.

12. An uninterruptible power supply system as recited in claim 6, in which the primary power source is a utility power supply.

13. An uninterruptible power supply system as recited in claim 6, further comprising a filter capacitor operatively connected across at least a portion of the third windings.

14. A method of supplying uninterruptible power to at least one load from a primary power source and a battery system, the method comprising the steps of:

providing a ferroresonant transformer comprising
a core;
a main shunt arranged to define a primary side and a secondary side of the ferroresonant transformer;
first windings arranged on the primary side of the ferroresonant transformer;
second windings arranged on the secondary side of the ferroresonant transformer;
third windings arranged on the secondary side of the ferroresonant transformer, where the third windings define first and second intermediate points; operatively connecting a first tap connector to the first intermediate point defined by the third windings;

operatively connecting a second tap connector to the second intermediate point defined by the third windings;

operatively connecting a selection connector to the at least one load;

operatively connecting an inverter to the second windings;

operatively connecting the first windings to the primary power source;

operatively connecting the inverter to the battery system;

in a line mode, causing power to flow from the primary source to the at least one load through the ferroresonant transformer;

in a standby mode, causing power to flow from the inverter to the at least one load through the ferroresonant transformer; and based on voltage requirements of the at least one load, operatively selectively connecting the selection connector to a selected tap connector selected from the first and second tap connectors.

15. A method as recited in claim 14, further comprising the steps of:

providing a select switch;

operating the select switch to connect a resonant capacitor to the third windings when the uninterruptible power supply is in the line mode; and operating the select switch to disconnect the resonant capacitor from the third windings when the uninterruptible power supply is in the standby mode.

16. A method as recited in claim 14, in which the step of providing the ferroresonant transformer comprises the step of arranging an inductor to form the main shunt.

17. A method as recited in claim 14, in which the step of providing the inverter comprises the step of providing a pulse-width modulated inverter.

18. A method as recited in claim 14, in which the step of providing the inverter comprises the step of providing a switch mode power supply.

19. A method as recited in claim 14, in which the step of operatively connecting the first windings to the primary power source comprises the step of operatively connecting the first windings to a utility power supply.

20. A method as recited in claim 14, further comprising the step of operatively connecting a filter capacitor across at least a portion of the third windings.

* * * * *